United States Patent
Ka et al.

(10) Patent No.: US 9,957,147 B2
(45) Date of Patent: May 1, 2018

(54) AUTOMATIC EXTRACTION DEVICE AND METHOD FOR CONTROLLING AUTOMATIC EXTRACTION

(71) Applicant: COWAY CO., LTD., Chungcheongnam-do (KR)

(72) Inventors: Jin-Seong Ka, Seoul (KR); Ki-Chul Kim, Seoul (KR); Su-Yong Park, Seoul (KR)

(73) Assignee: Coway Co., Ltd (KR)

( * ) Notice: Subject to any disclaimer, the term of this patent is extended or adjusted under 35 U.S.C. 154(b) by 20 days.

(21) Appl. No.: 14/898,011

(22) PCT Filed: Nov. 28, 2013

(86) PCT No.: PCT/KR2013/010913
§ 371 (c)(1),
(2) Date: Dec. 11, 2015

(87) PCT Pub. No.: WO2014/208834
PCT Pub. Date: Dec. 31, 2014

(65) Prior Publication Data
US 2016/0122173 A1    May 5, 2016

(30) Foreign Application Priority Data
Jun. 26, 2013    (KR) .................. 10-2013-0073570

(51) Int. Cl.
*B65B 1/04*    (2006.01)
*B67D 1/12*    (2006.01)
(Continued)

(52) U.S. Cl.
CPC ........... *B67D 1/1277* (2013.01); *B01D 35/00* (2013.01); *B67D 1/0004* (2013.01);
(Continued)

(58) Field of Classification Search
CPC ...... B67D 1/00; B67D 1/0888; B67D 1/1236; B67D 1/124; B67D 1/0004; B67D 1/1277;
(Continued)

(56) References Cited

U.S. PATENT DOCUMENTS

| 4,202,387 A * | 5/1980 | Upton ...................... B65B 3/36 |
| | | 141/360 |
| 4,437,499 A | 3/1984 | Devale |

(Continued)

FOREIGN PATENT DOCUMENTS

| DE | 102 05 944 | 8/2003 |
| EP | 0 270 923 | 6/1988 |

(Continued)

OTHER PUBLICATIONS

European Search Report dated May 12, 2016 issued in counterpart application No. 13887849.1-1370, 7 pages.

(Continued)

*Primary Examiner* — Nicholas J Weiss
*Assistant Examiner* — Randall Gruby
(74) *Attorney, Agent, or Firm* — The Farrell Law Firm, P.C.

(57) ABSTRACT

An automatic extraction device may include a displacement measuring unit for measuring the distance to a container by transmitting a measurement signal and then generating the measurement value which corresponds to the distance to the container; a control unit for outputting a water extraction signal if the measurement value is included within the predetermined target distance range and if the measurement value is not changed during the predetermined reference time; and a water extraction cock for supplying fluid to the container by opening a water extraction valve if the water discharge signal is input.

10 Claims, 4 Drawing Sheets

(51) Int. Cl.
  *B01D 35/00* (2006.01)
  *B67D 1/00* (2006.01)
  *B67D 1/08* (2006.01)
  *C02F 1/00* (2006.01)

(52) U.S. Cl.
  CPC .......... *B67D 1/0888* (2013.01); *B67D 1/0014* (2013.01); *B67D 1/124* (2013.01); *B67D 1/1236* (2013.01); *B67D 2210/00065* (2013.01); *C02F 1/003* (2013.01); *C02F 2307/10* (2013.01)

(58) Field of Classification Search
  CPC ...... B67D 2001/009; B67D 2001/0811; B67D 2210/00065; B01D 35/00; C02F 1/003; C02F 2307/10; G07F 13/065
  See application file for complete search history.

(56) References Cited

U.S. PATENT DOCUMENTS

| | | | | |
|---|---|---|---|---|
| 4,440,200 A * | 4/1984 | DeVale | ............... | G01F 13/006 141/198 |
| 4,559,979 A | 12/1985 | Koblasz et al. | | |
| 4,572,253 A | 2/1986 | Farmer et al. | | |
| 4,635,691 A * | 1/1987 | Hume | ............... | B67D 3/0025 141/198 |
| 4,733,381 A * | 3/1988 | Farmer | ............... | B67D 1/1238 141/198 |
| 4,780,861 A * | 10/1988 | Stembridge | ........ | B67D 1/1238 141/95 |
| 4,798,232 A * | 1/1989 | Stembridge | .......... | B06B 1/0681 141/1 |
| 4,817,689 A * | 4/1989 | Stembridge | .......... | B06B 1/0681 141/198 |
| 4,883,100 A * | 11/1989 | Stembridge | .......... | B06B 1/0681 141/1 |
| 4,917,155 A * | 4/1990 | Koblasz | ............... | B67D 1/1238 141/1 |
| 4,944,332 A | 7/1990 | Belland | | |
| 4,944,335 A * | 7/1990 | Stembridge | .......... | B06B 1/0681 141/1 |
| RE33,435 E * | 11/1990 | Koblasz | ............... | B67D 1/1238 141/1 |
| 5,060,484 A * | 10/1991 | Bush | ............... | F25C 5/187 340/621 |
| 5,491,333 A * | 2/1996 | Skell | ............... | B67D 1/1236 141/95 |
| 5,551,598 A * | 9/1996 | Cutsinger | ............ | B67D 1/1234 137/624.2 |
| 5,573,041 A * | 11/1996 | Skell | ............... | B67D 1/124 141/1 |
| 5,744,793 A * | 4/1998 | Skell | ............... | B67D 1/1238 222/641 |
| 5,862,844 A * | 1/1999 | Perrin | ............... | B67D 1/1238 141/192 |
| 6,082,419 A * | 7/2000 | Skell | ............... | B67D 1/1236 141/198 |
| 6,100,518 A * | 8/2000 | Miller | ............... | B67D 1/1236 141/1 |
| 6,394,153 B2 * | 5/2002 | Skell | ............... | B67D 1/1236 141/198 |
| 6,417,602 B1 * | 7/2002 | Agam | ............... | G10K 11/28 310/335 |
| 6,619,512 B1 * | 9/2003 | Sayers | ............... | A47K 5/1207 222/181.3 |
| 6,877,642 B1 * | 4/2005 | Maddox | ............... | A47K 5/1208 222/105 |
| 7,028,861 B2 * | 4/2006 | Sayers | ............... | A47K 5/1217 222/1 |
| 7,617,850 B1 | 11/2009 | Domey | | |
| 7,815,074 B2 * | 10/2010 | Ciavarella | ............ | A47K 5/12 141/383 |
| 8,028,728 B2 * | 10/2011 | Cooper | ............ | B67D 1/0878 141/192 |
| 8,069,883 B2 * | 12/2011 | Shiraishi | ............ | B67D 1/0027 141/351 |
| 8,109,301 B1 * | 2/2012 | Denise | ............... | F25C 5/005 141/198 |
| 8,245,735 B2 * | 8/2012 | Chase | ............... | B67D 1/001 141/1 |
| 8,443,614 B2 * | 5/2013 | Kim | ............... | F25D 29/00 141/370 |
| 8,505,593 B1 * | 8/2013 | Denise | ............... | F25C 5/005 141/198 |
| 8,511,348 B2 * | 8/2013 | Lillard, Jr. | ......... | B67D 1/0888 141/2 |
| 8,695,646 B2 * | 4/2014 | Agam | ............... | A47J 31/44 141/198 |
| 8,813,794 B2 * | 8/2014 | Ashrafzadeh | ........ | B67D 1/0858 141/192 |
| 9,057,556 B2 * | 6/2015 | Ashrafzadeh | ........ | B67D 1/001 |
| 9,085,453 B2 * | 7/2015 | McMahan | ............ | B67D 7/221 |
| 9,126,818 B2 * | 9/2015 | Chase | ............... | B67D 1/0858 |
| 9,417,003 B2 * | 8/2016 | Baack | ............... | F25C 5/005 |
| 9,534,360 B2 * | 1/2017 | Toivonen | ............ | E03C 1/057 |
| 9,796,575 B2 * | 10/2017 | Deng | ............... | A47J 31/4482 |
| 2001/0050116 A1 * | 12/2001 | Skell | ............... | B67D 1/1236 141/351 |
| 2003/0089423 A1 | 5/2003 | Barton et al. | | |
| 2006/0124662 A1 | 6/2006 | Reynolds et al. | | |
| 2008/0264092 A1 * | 10/2008 | Chase | ............... | B67D 1/0858 62/389 |
| 2009/0071567 A1 * | 3/2009 | Cooper | ............ | B67D 1/0878 141/94 |
| 2009/0127282 A1 * | 5/2009 | Reynolds | ............ | A47K 5/1217 222/23 |
| 2013/0000337 A1 * | 1/2013 | Krause | ............... | B67D 1/0888 62/177 |
| 2013/0228250 A1 * | 9/2013 | Agam | ............... | A47J 31/44 141/83 |
| 2014/0137982 A1 * | 5/2014 | Nicholls | ............ | B67D 1/0007 141/83 |
| 2015/0315008 A1 * | 11/2015 | Locke | ............... | B67D 1/1279 222/52 |
| 2017/0010034 A1 * | 1/2017 | Doering | ............ | F25C 5/005 |
| 2017/0365124 A1 * | 12/2017 | Locke | ............... | G07F 13/00 |

FOREIGN PATENT DOCUMENTS

| | | |
|---|---|---|
| EP | 2 006 623 | 12/2008 |
| EP | 2 940 491 | 11/2015 |
| KR | 1019890001209 | 4/1989 |
| KR | 200354220 | 6/2004 |
| KR | 1020060067876 | 6/2006 |
| WO | WO 96/17799 | 6/1996 |
| WO | WO 03042612 | 5/2003 |

OTHER PUBLICATIONS

Chinese Office Aciton dated Jan. 23, 2017 issued in counterpart application No. 201380077814.9, 8 pages.

* cited by examiner

AUTOMATIC EXTRACTION DEVICE AND METHOD FOR CONTROLLING AUTOMATIC EXTRACTION

PRIORITY

This application is a National Phase Entry of PCT International Application No. PCT/KR2013/010913, which was filed on Nov. 28, 2013, and claims a priority to Korean Patent Application No. 10-2013-0073570, which was filed on Jun. 26, 2013, the contents of each of which are incorporated herein by reference.

TECHNICAL FIELD

The present invention relates to an automatic extraction device and a method for controlling automatic extraction, and more particularly, to an automatic extraction device for sensing a provided container and automatically supplying fluid, and a method for controlling automatic extraction.

BACKGROUND ART

The use of water purifiers in various spaces including households to obtain purified drinking water has become prevalent. Water purifiers, devices for filtering natural water (hereinafter, water before being purified is referred to as "raw water") such as tap water or underground water, filter raw water through several filters to remove foreign objects or harmful materials included in the raw water to provide drinking water.

In general water purifiers, in order to extract water, a user needs to mechanically press a switch or touch an electronic switch. Here, water may splash, and the user should press the switch until a desired amount of water is provided. Thus, recently, water purifiers providing an automatic extraction function of extracting a required amount of water once an extraction button is pressed, enhancing user convenience, have been widely used. However, also, in this case, a user needs to perform an additional function of pressing the extraction button, or the like. That is, a technique of performing a water extraction operation desired by a user, while minimizing a user operation, is required.

DISCLOSURE

Technical Problem

An exemplary embodiment in the present disclosure may provides an automatic extraction device for sensing a provided container and automatically supplying fluid thereto, and a method for controlling automatic extraction.

Technical Solution

According to an exemplary embodiment in the present invention, there is provided an automatic extraction device including: a displacement measuring unit transmitting a measurement signal to measure a distance to a container and generate a measurement value corresponding to the distance to the container; a control unit outputting a water extraction signal when the measurement value is within a preset target distance range and not changed for a preset reference period of time; and a water extraction cock opening a water extraction valve to supply fluid to the container when the water extraction signal is input.

Here, after transmitting the measurement signal, the displacement measurement unit may measure a time required for the measurement signal to be returned after being reflected from a surface of the container, and may generate the measurement value using a propagation rate of the measurement signal and the required time.

Here, the target distance range may be set by applying a preset error range to a distance from the displacement measuring unit to the water extraction cock.

Here, when the measurement value is within the preset target distance range and is not changed for the preset reference period of time, the control unit may output the water extraction signal to control the water extraction cock to extract water for a preset target water extraction period of time or by a preset target water extraction flow rate.

Here, when the measurement value is outside of the target distance range or a change in the measurement value is detected, the control unit may output a water extraction stop signal in such a manner that the fluid supply from the water extraction cock is stopped.

Here, when the water extraction stop signal is output, the control unit may stop counting a water extraction period of time during which fluid is extracted.

Here, after the water extraction signal is output, when the measurement value is increased by more than a preset variation, the control unit may output the water extraction stop signal, and when the measurement value is increased by less than the preset variation, or when the measurement value is decreased, the control unit may maintain the water extraction.

Here, after the water extraction stop signal is output, when the measurement value is not changed for a preset waiting period of time, the control unit may output a water extraction resumption signal for resuming water extraction from the water extraction cock and counting the stopped water extraction period of time and the water extraction flow rate.

Here, after the water extraction stop signal is output, when the measurement value is outside of a preset sensing distance, the control unit may initialize the water extraction period of time or the water extraction flow rate.

Here, the automatic extraction device may further include a user recognition unit generating a recognition signal informing a user about fluid extraction using light or a sound when the water extraction signal is input.

Here, when a preset recognition period of time has elapsed since the recognition signal was generated, the water extraction cock may open the water extraction valve.

According to another aspect of the present invention, there is provided a method for controlling automatic extraction including: a displacement value generating operation of transmitting a measurement signal by a displacement sensor to measure a distance to a container and generating a measurement value corresponding to the distance to the container; a container checking operation of outputting a water extraction signal when the measurement value is within a preset target distance range and is not changed for a preset reference period of time; and a fluid supply operation of opening a water extraction valve and supplying fluid to the container when the water extraction signal is input.

The aforementioned technical solutions do not fully enumerate all of the features of the present invention. The foregoing and other objects, features, aspects and advantages of the present invention will become more apparent from the following detailed description of the present invention when taken in conjunction with the accompanying drawings.

Advantageous Effects

In the automatic extraction device and the method for controlling automatic extraction according to an embodiment of the present disclosure, fluid may be provided when a container is accurately positioned at a water extraction point and the container is not moved at the water extraction point. Thus, the fluid may be accurately and stably provided.

Also, in the automatic extraction device and the method for controlling automatic extraction according to an embodiment of the present disclosure, when a movement of the container is detected, the supply of the fluid may be immediately stopped, preventing residual water that may be generated when the container is released.

BEST MODE

Figure 1:
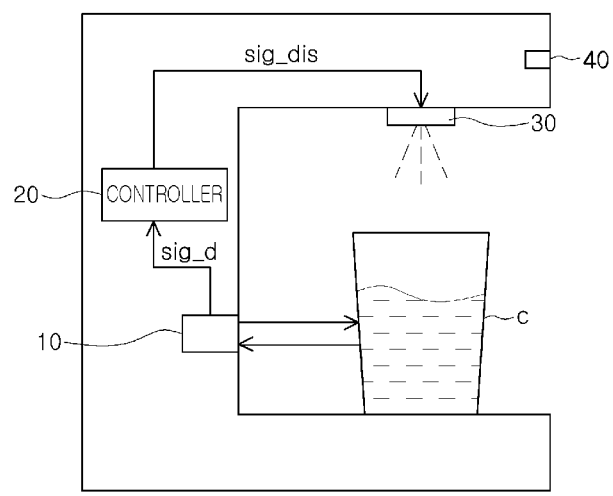
FIG. 1 is a schematic view illustrating an automatic extraction device according to an embodiment of the present disclosure.

Hereinafter, embodiments will be described in detail with reference to the accompanying drawings such that they can be easily practiced by those skilled in the art to which the present invention pertains. In describing the present invention, if a detailed explanation for a related known function or construction is considered to unnecessarily divert the gist of the present invention, such explanation will be omitted but would be understood by those skilled in the art. Also, similar reference numerals are used for the similar parts throughout the specification.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements.

FIG. 1 is a schematic view illustrating an automatic extraction device according to an exemplary embodiment.

Referring to FIG. 1, the automatic extraction device according to an exemplary embodiment may include a displacement measuring unit 10, a control unit 20, and a water extraction cock 30.

Hereinafter, the automatic extraction device according to an exemplary embodiment will be described with reference to FIG. 1.

The displacement measuring unit 10 may measure a distance to a container c by transmitting a measurement signal, and may generate a measurement value sig_d corresponding to the distance to the container c. The displacement measuring unit 10 may measure the distance to the container c using any one of an infrared sensor, an ultrasonic sensor, and a laser sensor. In addition, various types of sensors may also be used. That is, types of sensors for measuring the distance to the container c are not limited, and the displacement measuring unit 10 may utilize any sensor as long as the sensor may be able to measure the distance to the container c and generate the measurement value sig_d.

In detail, the displacement measuring unit 10 may transmit the measurement signal, measure a time for the measurement signal to return after being reflected from a surface of the container c, and may generate the measurement value sig_d using a propagation speed of the measurement signal and the return time. For example, when the displacement measuring unit 10 outputs an infrared ray as the measurement signal, a propagation speed of the infrared ray is a known value and the return time is a value that may be known through measurement, and thus, the distance to the container c may be calculated using a proportional expression between the propagation speed and the return time.

When the measurement value sig_d is within a preset target distance range and is not changed for a preset reference period of time, the control unit 20 may output a water extraction signal sig_dis. That is, the control unit 20 may determine whether the container c is present at a water receiving point as a position in which fluid supplied from the water extraction cock 30 and whether the container c is moved. According to the determination result, the control unit 20 may control whether the water extraction cock 30 is to supply fluid.

Figure 2:
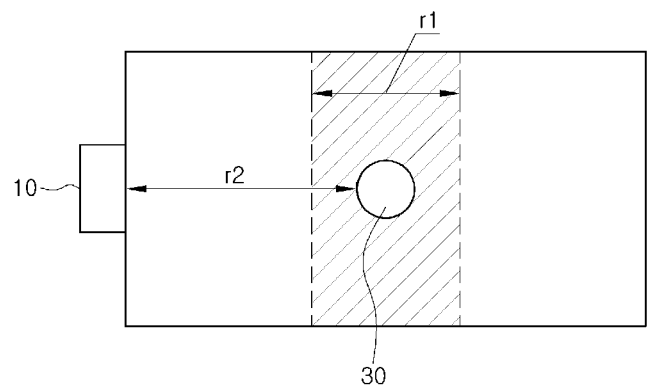
FIGS. 2 and 3A and 3B are schematic views illustrating a principle of an automatic extraction device according to an embodiment of the present disclosure.
Figure 3A:
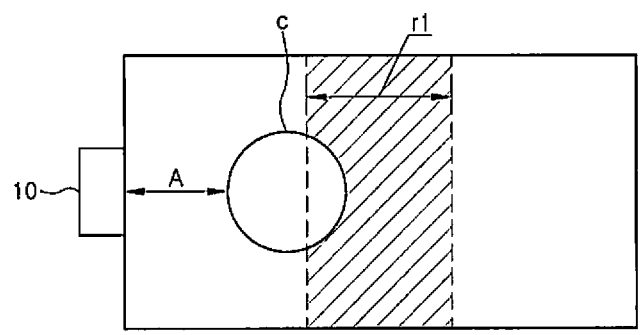
Figure 3B:
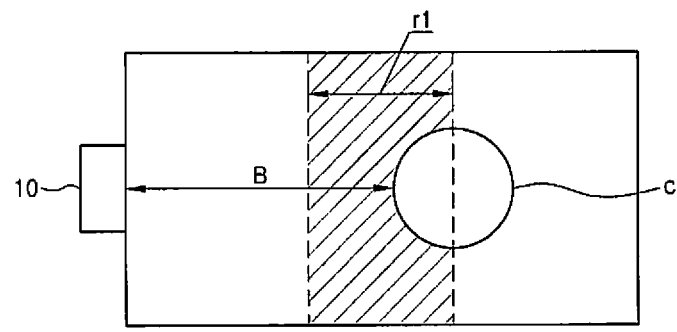

In order to accurately recognize whether the container c is present at the water extraction point, it is important to set the target distance range. In detail, referring to FIG. 2, the target distance range r1 may be set by applying a preset error range to a distance r2 from the displacement measuring unit 10 to the water extraction cock 30. The error range may be set to be varied according to types or sizes of the container c. Also, in a case in which the measurement value A is outside of the target distance range as illustrated in FIG. 3A, fluid supplied from the water extraction cock 30 will not be captured in the container c. Thus, in this case, the control unit 20 may not output the water extraction signal sig_dis without having to consider whether the container c is moved. In contrast, in a case in which the measurement value B corresponds to a distance within the target distance range, when the water extraction cock 30 extracts fluid, since the container c is in position, the control unit 20 may output the water extraction signal sig_dis. However, even though the measurement value is-corresponds to a distance within the target distance range but the container c is moved, fluid may not be properly supplied, and thus, whether the container c is moved may be further considered.

Regarding movement of the container c, the displacement measuring unit 10 may measure the measurement value sig_d at every preset period and calculate a variation of the measurement value sig_d measured at every period to determine whether the container c has been moved. That is, it may be considered that, when the variation is 0, the container c is stationary, and when the variation exceeds 0, the container is moved. Thus, only when the measurement value sig_d of the container c is not changed for a preset reference period of time, may the control unit 20 determine that the container c is stationary, and output the water extraction signal sig_dis. Here, whether the container c is moved may be determined on the basis of a value equal to or greater than 0 in consideration of an error of the variation.

As described above, only when the measurement value sig_d corresponds to a distance within the preset target distance range and is not changed for the preset reference period of time, may the control unit 20 output the water extraction signal sig_dis to provide fluid to the container c. However, when the container c is moved or is moved out of the target distance range while the fluid is being provided, the fluid may splash outwardly or may be spilled, rather than being supplied to the container c, and output of the water extraction signal sig_dis is terminated to avoid spilling fluid onto the floor, to avoid user inconvenience, and avoid the risk of generating safety hazards, electric shock, or a fire due to the slippery floor.

In order to prevent the occurrence of such a situation, when the measurement value (sig_d) is outside of the target distance range or a change in the measurement value (sig_d) is sensed, the control unit 20 may output a water extraction stop signal to stop fluid supply from the water extraction cock 30. That is, when a movement of the container c is sensed while fluid is being supplied, the control unit 20 may stop the fluid supply. In particular, according to the automatic extraction device of the present disclosure, even a slight movement of the container c may be sensed through a change in the measurement value sig_d, and thus, a case in which the fluid is splashed or spilled, without being supplied to the container c, may be prevented.

Meanwhile, the control unit 20 may control whether to output the water extraction stop signal differently according to a direction in which the container c is moved. That is, when the container c is moved in a direction toward the displacement measuring unit 10, the container 20 may maintain fluid supply from the water extraction cock, and when the container c is moved in the opposite direction, the control unit 20 may output the water extraction stop signal to stop the fluid supply of the water extraction cock. This is controlling in consideration of a usage manner of the user. In a case in which fluid is supplied to the container c using the automatic extraction device, a case in which the user moves the container c toward the displacement measuring unit 10 by directly adjusting a position of the container c may frequently occur. If the fluid supply is stopped even in a case in which the user adjusts the container c in order to correct the position of the container c, user convenience may be drastically degraded and user complaints may be caused. Thus, after the water extraction signal sig_dis is output, when the measurement value is increased by more than the preset variation, the control unit 20 may output the water extraction stop signal, and when the measurement value is increased by less than the preset variation or reduced, the control unit 20 may maintain water extraction.

In addition, when the water extraction signal is output, the control unit 20 may count a water extraction time during which the fluid is extracted from the water extraction cock 30 to determine a rate of flow of the extracted fluid, and may supply the fluid until the counted water extraction time or the water extraction flow rate continues for a target water extraction time or a target water extraction flow rate, respectively. However, as mentioned above, when the water extraction stop signal is output while the fluid is being supplied, the control unit 20 may shut the water extraction valve of the water extraction cock 30, and may stop counting the water extraction time or the water extraction flow rate. The halt in supply of the fluid due to the water extraction stop signal may be temporary, and thus, counting the water extraction time or the water extraction flow rate may also be stopped until the fluid supply is resumed.

Here, when the measurement value is not changed for a preset waiting time after the output of the water extraction stop signal, water extraction from the water extraction cock. 30 may be resumed, and the counting may resume from the point at which the counting was stopped due to the water extraction stop signal. Meanwhile, after the water extraction stop signal is output, when the measurement value is outside of the preset sensing distance, the counted water extraction time or water extraction flow rate may be initialized. The sensing distance may be a maximum distance that may be measured by the displacement measuring unit 10, and thus, if the container c is away by more than the sensing distance, it may be anticipated that the fluid supply may not be performed on the container c any longer. Thus, even though fluid has not been supplied by the preset target water extraction time or target water extraction flow rate, the counted water extraction time or water extraction flow rate may be initialized to prepare fluid supply with respect to a new container c. That is, in a case in which fluid is supplied to the container c after the initialization, the fluid may be supplied by a total target water extraction time or the target extraction water flow rate.

When the water extraction signal sig_dis is input, the water extraction cock 30 may open the water extraction valve to supply fluid to the container c. As illustrated in FIG. 1, a position of the water extraction cock 30 may be fixed, and the water extraction cock 30 may be provided with various types of fluids through a storage type water tank or direct type supply pipe and provide the received fluid according to the water extraction signal sig_dis.

When the water extraction signal sig_dis is input, the water extraction cock 30 may extract fluid for a preset target water extraction period of time or by a preset target water extraction flow rate. In detail, a flow sensor may be provided in the water extraction cock 30, and whether to shut the water extraction valve may be determined based on whether the water extraction flow rate of the water extraction cock 30 counted by the flow rate sensor is equal to the target water extraction flow rate. Here, the control unit 20 may compare the water extraction flow rate measured by the flow rate sensor with the target water extraction flow rate. In addition, the control unit 30 may count a water extraction period of time during which water is extracted from the water extraction cock 30 by using an internal timer, or the like, and may compare the water extraction period of time with the target water extraction period of time to determine whether to shut the water extraction valve. In addition, the control unit 30 may input the water extraction signal sig_dis until the water extraction cock 30 supplies fluid for the target water extraction period of time or by the target water extraction flow rate, and when input of the water extraction signal sig_dis by the control unit 30 is stopped, the water extraction valve may be shut.

However, when a water extraction stop signal is input by the control unit 20 while the water extraction cock 30 is supplying fluid, the control unit 20 may shut the water extraction valve to stop supplying the fluid. In this case, counting of the water extraction period of time or the water extraction flow rate may be stopped, and thereafter, when a water extraction resumption signal is input by the controller 20, the stopped water extraction period of time or the water extraction flow rate may be counted. That is, water extraction from the water extraction cock 30 is resumed according to the water resumption signal to extract water to follow the previous flow rate (in succession to the previous flow rate at which the wafer extraction was_stopped) up to the target water extraction period of time or the target water extraction flow rate.

The automatic extraction device according to an exemplary embodiment may further include a user recognition unit 40. The user recognition unit 40 may generate a recognition signal indicating extraction of the fluid to the user using light or a sound when the water extraction signal sig_dis is input. For example, a buzzer may be used as the user recognition unit 40, and before fluid is extracted from the water extraction cock 30, the buzzer may generate a signal sound to inform the user that fluid will be extracted soon. Alternatively, an indicating lamp including a light emitting diode (LED) lamp may be utilized as the user recognition unit 40. That is, when the indicating lamp is turned on, the user may recognize that fluid will be extracted soon. In particular, in a case in which the user performs cleaning or in a case in which the user places his or her hand or other object within the target distance range unconsciously, the user recognition unit 40 may inform the user that fluid will be extracted soon, so that the user may take measures to prevent extraction of fluid.

Figure 4:
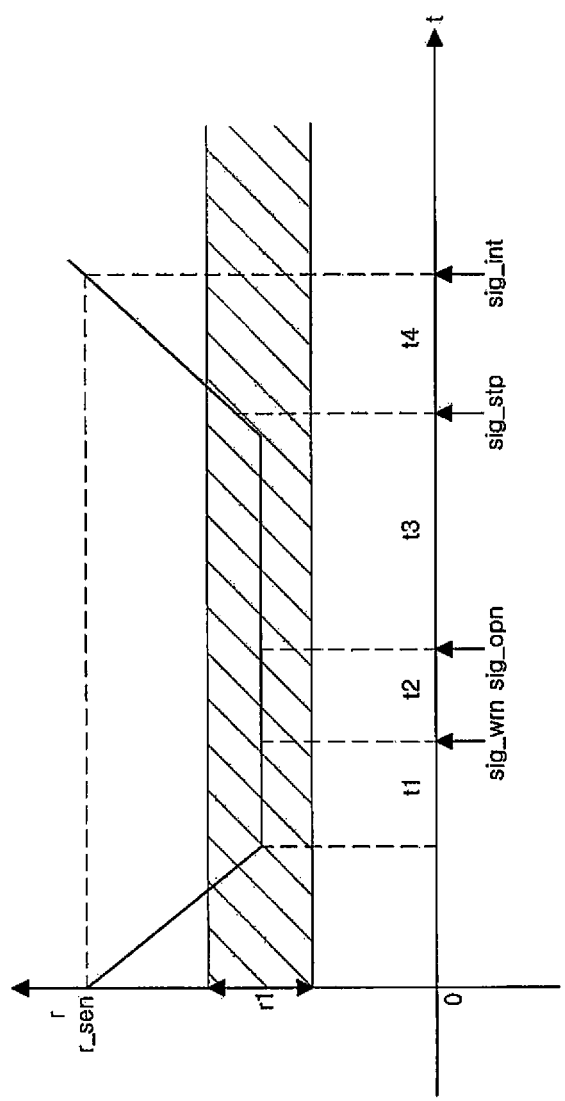
FIG. 4 is a graph illustrating an operation of an automatic extraction device according to an embodiment of the present disclosure.

FIG. 4 is a graph illustrating an operation of an automatic extraction device according to an exemplary embodiment. In detail, FIG. 4 is a graph illustrating a distance to the container c measured by the displacement sensing unit 10, in which the t axis denotes time and the r axis denotes a distance.

Hereinafter, an operation of the automatic extraction device according to an exemplary embodiment of the present disclosure will be described with reference to FIG. 4.

First, when a movement of the container c, which has entered a target distance range r1, is no longer sensed, a time is counted. When the container c is stably maintained without movement for a preset reference period of time t1, the control unit 20 outputs a water extraction signal sig_dis. Upon receiving the water extraction signal sig_dis, the user recognition unit 40 generates a recognition signal sig_wrn to inform the user that fluid will be extracted soon, and thereafter, when a preset recognition period of time t2 has lapsed, an opening signal sig_opn for opening a water extraction valve may be input to a water extraction valve of the water extraction cock 30 to start supplying fluid. For example, as the recognition signal sig_wrn, a low signal sound may be generated or an indication lamp may be turned on to inform the user that fluid will be extracted soon. Thus, the user may be cautious not to move the container c according to the recognition signal sig_wrn, and thus, in a case in which the automatic extraction device generates the recognition signal upon recognizing an object other than the container c, the user may remove the object to prevent the extracted fluid from wetting the floor or the object. Here, the reference period of time t1 may be 500 ms, and the recognition period of time t2 may be 1.5 s.

When fluid starts to be supplied, the fluid may be supplied until a preset target water extraction time (t3) or a target water extraction flow rate is satisfied. Here, when the container c is moved before the target water extraction time or the target water extraction flow rate is reached, the fluid supply may be stopped. As illustrated in FIG. 4, when the measurement value is increased by more than a preset variation after the output of the water extraction signal sig_dis, a water extraction stop signal sig_stp may be output. That is, even in a case in which the measurement value corresponds to a distance within the target distance range r1, when a variation of the measurement value changing within a unit time is equal to or greater than a preset variation, the water extraction stop signal sig_stp may be output to stop discharging the fluid. Here, however, when the measurement value is reduced, the water extraction stop signal sig_stp may not be output. This is because a case in which the user moves the container c toward the water extraction cock 30 to ensure stable fluid supply in using the automatic extraction device occurs frequently as discussed above. When the container c is moved toward the water extraction cock 30, the measurement value is reduced, and in this case, the water extraction stop signal sig_stp may not be output.

Once the water extraction stop signal sig_stp is input, the control unit 20 may stop counting the water extraction time or the water extraction flow rate. However, when a movement of the container c is not sensed for a preset waiting period of time t4 and the measurement value is within the target distance range r1, fluid may start to be supplied continuously from the stopped counting. Thus, fluid at the target water extraction flow rate may be provided to the container c.

After the water extraction stop signal sig_stp is input, when the measurement value is outside of a preset sensing distance r_sen, counting of the water extraction time or the water extraction flow rate counted by the control unit 20 may be initialized according to an initialization signal sig_int. This is because, when the container c is outside of the sensing distance r_sen, it may be considered that the user has taken the container c and used it, and thus, the water extraction flow rate and the water extraction time may be initialized to prepare the next water extraction by the user.

Figure 5:
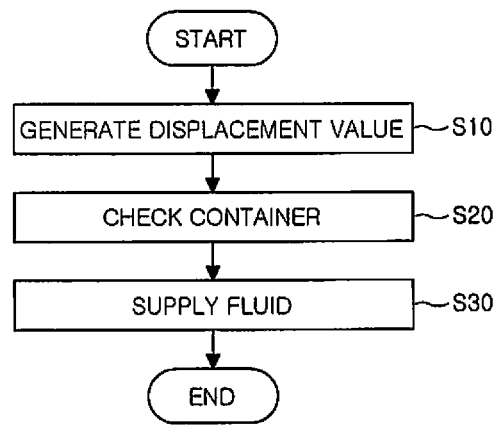
FIG. 5 is a flow chart illustrating a method for controlling automatic extraction according to an embodiment of the present disclosure.

FIG. 5 is a flow chart illustrating a method for controlling automatic extraction according to an exemplary embodiment.

Referring to FIG. 5, the method of controlling automatic extraction according to an exemplary embodiment may include a displacement value generation operation S10, a container checking operation S20, and a fluid supply operation S30.

Hereinafter, the method of controlling automatic extraction according to an exemplary embodiment will be described.

In the displacement value generation operation S10, a displacement sensor may transmit a measurement signal to measure a distance to a container, and may generate a measurement value corresponding to the distance to the container. As discussed above, the displacement sensor may measure the distance to the container using an infrared ray, or the like, as a measurement signal. In detail, after the measurement signal is transmitted, a time required for the measurement signal to be returned after being reflected from a surface of the container may be measured to calculate the distance.

In the container checking operation S20, when the measurement value within a preset target distance range is not changed for a preset reference period of time, a water extraction signal may be output. That is, the container checking operation S20 detects whether the container is present in a water receiving position in which fluid may be received from the water extraction cock or whether the container is moved, to determine whether the container is in a state of being available to receive fluid.

First, in the container checking operation S20, it is detected whether the measurement value is within the target distance range to determine whether the container is present in a water receiving position. In detail, the water receiving position may be present vertically below the water extraction cock. However, in consideration of a size of an opening of the container, the water receiving position may have an error range by the size of the opening vertically below the water extraction cock. Thus, when the target distance range is set by applying a preset error range to the distance from the displacement sensor to the water extraction cock, it may be determined whether the container is present in the water receiving position by simply determining whether the measurement value is within the target distance range.

Also, whether the container is moved may be determined by calculating a variation of the measurement value. That is, it may be considered that, when the variation is 0, the container c is stationary, and when the variation exceeds 0, the container c is moved. Thus, only when the measurement value of the container c is not changed for a preset reference period of time, it may be determined that the container c is stationary.

That is, only when the measurement value of the container c is within the preset target distance range and is not changed for the preset reference period of time, it may be considered that the container is in a state of being available to receive fluid, and thus, in the container checking operation S20, the water extraction signal may be output to request a supply of fluid.

In the fluid supply operation S30, when the water extraction signal is input, a water extraction valve may be opened to supply fluid to the container. Since whether the container is in a state of being available to receive fluid is checked in the container checking operation S20, the water extraction valve is opened according to the water extraction signal to supply fluid to the container in the fluid supply operation S30.

However, when the container is moved or is moved out of the target distance range in the course of supplying fluid, fluid cannot be properly supplied to the container, and thus the fluid supply is stopped. That is, in the fluid supply operation S30, even after fluid is extracted, a measurement value is generated, and whether the measurement value is within the target distance range and whether the measurement value is changed are determined to control whether to supply fluid. When the measurement value is outside of the target distance range or when the measurement value is changed, the water extraction valve may be shut to stop the fluid supply.

Although not shown, there may be various types of water treatment devices including the automatic extraction device. Here, the water treatment devices may generally refer to a water purifier, a functional water purifier, a water heater, a water cooler, an ice maker, or a device having at least a portion of the functions of these devices in a complex manner.

While exemplary embodiments have been shown and described above, it will be apparent to those skilled in the art that modifications and variations could be made without departing from the scope of the present invention as defined by the appended claims.

The invention claimed is:

1. An automatic extraction device comprising:
a displacement measuring unit configured to transmit a measurement signal to measure a distance to a container and generate a measurement value corresponding to a distance to the container;
a control unit configured to output a water extraction signal when the generated measurement value corresponds to a distance within a preset target distance range and is not changed for a preset reference period of time;
a user recognition unit configured to generate a recognition signal upon receiving the water extraction signal; and
a water extraction cock configured to open a water extraction valve to supply fluid to the container,
wherein the preset target distance range is set by applying a preset error range to a distance from the displacement measuring unit to the water extraction cock,
wherein, when a preset recognition period of time has lapsed after generating the recognition signal, an opening signal for opening the water extraction valve is input to the water extraction valve of the water extraction cock to start supplying fluid, and
wherein, after the water extraction signal is output, when the measurement value is increased by more than a preset variation, the control unit outputs a water extraction stop signal to stop the supply of the fluid to the container.

2. The automatic extraction device of claim 1, wherein, after transmitting the measurement signal, the displacement measurement unit measures a time for the measurement signal to return after being reflected from a surface of the container, and generates the measurement value using a propagation rate of the measurement signal and the return time.

3. The automatic extraction device of claim 1, wherein when the measurement value corresponds to a distance within the preset target distance range and is not changed for the preset reference period of time, the control unit outputs the water extraction signal to control the water extraction cock to extract water for a preset target water extraction period of time.

4. The automatic extraction device of claim 3, wherein when the measurement value is outside of the preset target distance range, the control unit outputs the water extraction stop signal.

5. The automatic extraction device of claim 4, further comprising a timer, wherein the control unit is further configured to start counting from a start of a water extraction period of time during which water is extracted from the water extraction cock, and when the water extraction stop signal is output, the control unit stops counting the water extraction period of time.

6. The automatic extraction device of claim 1, wherein, after the water extraction stop signal is output, when the measurement value is not changed for a preset waiting period of time, the control unit outputs the water extraction signal for resuming water extraction from the water extraction cock.

7. The automatic extraction device of claim 5, wherein, after the water extraction stop signal is output, when the measurement value is outside of a preset sensing distance, the control unit initializes the water extraction period of time, and wherein the sensing distance is a maximum distance that may be measured by the displacement measuring unit.

8. The automatic extraction device of claim 1, wherein the user recognition unit outputs the recognition signal informing a user about fluid extraction upon receiving the water extraction signal, and wherein the recognition signal is one of a light and a sound.

9. A method for controlling automatic extraction, the method comprising:
transmitting, by a displacement measuring unit, a measurement signal by a displacement sensor to measure a distance to a container;
generating a measurement value corresponding to the distance to the container;
outputting a water extraction signal, by a control unit, when the measurement value corresponds to a distance within a preset target distance range and is not changed for a preset reference period of time; and opening a water extraction valve to supply fluid to the container when the water extraction signal is output, wherein the preset target distance range is set by applying a preset error range to a distance from the displacement measuring unit to the water extraction valve, and wherein, after the water extraction signal is output, when the measurement value is increased by more than a preset variation, outputting a water extraction stop signal to stop the supply of the fluid to the container, by the control unit.

10. An automatic extraction device comprising:

a displacement measuring unit configured to transmit a measurement signal to measure a distance to a container and generate a measurement value based on the measured distance;

a valve configured to supply fluid to the container; and a control unit configured to:
- when the measurement value corresponds to a distance within a preset target distance range and when the measurement value does not change for a preset reference period of time, output a water extraction signal to control the valve to supply a fluid to the container, and
- after the water extraction signal is output, when the measurement value is increased by more than a preset variation, output a water extraction stop signal to stop the supply of the fluid to the container, wherein the preset target distance range is set by applying a preset error range to a distance from the displacement measuring unit to the valve.

* * * * *